United States Patent
Zhou

(10) Patent No.: US 12,316,118 B2
(45) Date of Patent: May 27, 2025

(54) RESILIENT ROUTE GENERATION SYSTEM FOR RELIABLE COMMUNICATION IN POWER GRID PHASOR MEASUREMENT SYSTEM

(71) Applicant: ZHEJIANG LAB, Zhejiang (CN)

(72) Inventor: Boyang Zhou, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 440 days.

(21) Appl. No.: 17/741,379

(22) Filed: May 10, 2022

(65) Prior Publication Data

US 2022/0329073 A1    Oct. 13, 2022

Related U.S. Application Data

(63) Continuation of application No. PCT/CN2021/129961, filed on Nov. 11, 2021.

(30) Foreign Application Priority Data

Mar. 31, 2021   (CN) .......................... 202110344405.7

(51) Int. Cl.
*H02J 3/00*    (2006.01)
*H02J 3/14*    (2006.01)
(Continued)

(52) U.S. Cl.
CPC ............. *H02J 3/0073* (2020.01); *H02J 3/003* (2020.01); *H02J 3/144* (2020.01); *H02J 3/242* (2020.01); *H02J 13/00026* (2020.01)

(58) Field of Classification Search
CPC .......... H02J 3/003; H02J 3/0073; H02J 3/144; H02J 3/242; H02J 13/00026
(Continued)

(56) References Cited

U.S. PATENT DOCUMENTS

| 11,139,991 | B2 * | 10/2021 | Doshi ............... G06F 16/90339 |
| 2020/0127861 | A1 | 4/2020 | Doshi et al. |
| 2020/0136921 | A1 | 4/2020 | Doshi et al. |

FOREIGN PATENT DOCUMENTS

| CN | 103067476 A | 4/2013 |
| CN | 103716254 A | 4/2014 |

(Continued)

OTHER PUBLICATIONS

International Search Report (PCT/CN2021/129961); Date of Mailing: Jan. 28, 2022.
(Continued)

*Primary Examiner* — Hal Kaplan
(74) *Attorney, Agent, or Firm* — Wiersch Law Group

(57) ABSTRACT

Disclosed is a resilient route generation system for reliable communication of a phasor measurement system of a power grid. A named data network is a new network architecture to improve the communication reliability between a phasor measurement unit and a phasor measurement concentrator in power transmission and distribution networks. The lost data packets in a current router can be directly recovered from an upstream router with resilient route, and the optimal RR selection will maximize the success rate of retransmission of lost data packets, thus maximizing the network reliability. The mesh network and ring network structure of the power grid are fully utilized, and a resilient route generation system is provided, wherein the resilient route of each communication pair includes a corresponding primary path and a plurality of redundant sub paths, so that the success rate of retransmission of lost data packets and the network reliability are maximized.

8 Claims, 2 Drawing Sheets

(51) Int. Cl.
  *H02J 3/24* (2006.01)
  *H02J 13/00* (2006.01)

(58) Field of Classification Search
  USPC .......................................................... 307/38
  See application file for complete search history.

(56) References Cited

FOREIGN PATENT DOCUMENTS

| | | | |
|---|---|---|---|
| CN | 105704021 | A | 6/2016 |
| CN | 108833271 | A | 11/2018 |
| CN | 112491666 | A | 3/2021 |
| CN | 112737953 | A | 4/2021 |

OTHER PUBLICATIONS

CN First Office Action(202110344405.7); Date of Mailing: May 13, 2021.
CN Notice Of Allowance(202110344405.7); Date of Mailing: Jun. 15, 2021.

\* cited by examiner

RESILIENT ROUTE GENERATION SYSTEM FOR RELIABLE COMMUNICATION IN POWER GRID PHASOR MEASUREMENT SYSTEM

CROSS-REFERENCE TO RELATED APPLICATIONS

The present application is a continuation of International Application No. PCT/CN2021/129961, filed on Nov. 11, 2021, which claims priority to Chinese Application No. 202110344405.7, filed on Mar. 31, 2021, the contents of both of which are incorporated herein by reference in their entireties.

TECHNICAL FIELD

The present application belongs to the technical field of power system communication, in particular to a resilient route generation system for reliable communication in a phasor measurement system of a power grid.

BACKGROUND

In modern power grids, Phasor Measurement Units (PMUs) are widely deployed in substations and distribution networks. A PMU transmits the collected information such as lines and transformer phases to a Phasor Measurement Concentrator (PDC) through a WAN. However, a WAN may be affected by network congestion, link failure and other security issues, and there is a potential packet loss problem. The Transmission Control Protocol (TCP) is adopted to solve this problem. The guess of lost packets and the end-to-end retransmission of packets at the sender will lead to a sharp increase in the time interval between arrivals of packets, and the link failure will cause the interruption of the TCP connection.

At present, a Named Data Networking (NDN), as a new network architecture, has been verified by existing research work to improve the communication reliability of the phasor measurement system mentioned above. When a packet is forwarded on an NDN router, the router will cache the packet in its local Content Storage (CS). When an upstream link of an NDN router fails, the lost data packets due to the link failure are stored in the content cache of the upstream router. This redundancy of data packets enables the lost data packets to be directly recovered from the upstream router, thus avoiding the problem of data packet loss caused by link switching. The above measurement data route path from PMU to PDC becomes a Primary Path (PP). The key to realize fast retransmission of lost packets is to build a Redundant Sub-path (RSP) between the current router and its upstream router on a PP. The above PP and RSP are collectively referred to as a Resilient Route (RR), and the optimal RR selection will maximize the success rate of retransmission of lost packets, thus maximizing the reliability of the network. Under normal circumstances, the route that PMU sends data to PDC is the primary path. When the data packet is lost, the NDN router can request its upstream router (which caches the data packet) to resend the lost data packet along the redundant sub-path to ensure the safe operation of power grid control. However, for the mesh network and ring network structure of the phasor measurement communication network of a power grid, there is no relevant research work on the RR generation method at present, and the redundancy of the network itself is not fully utilized.

SUMMARY

In view of the shortcomings of the prior art and taking the present disclosure patent 202110144836.9 as the background, the purpose of the present disclosure is to provide a resilient route generation system for reliable communication of a phasor measurement system of a power grid.

The purpose of the present disclosure is realized by the following technical scheme: a resilient route generation system for reliable communication of a phasor measurement system of a power grid mainly consists of a RR vector generation module, a RR communication pair generation module and a RSP path generation module; an input of the resilient route generation system includes a network topology G, a RR configuration, a current router $r_j$ and a destination router $r_k$, and an output is $Y=\{p_{prim}, X\}$; $p_{prim}$ is a primary path from the current router to the destination router, and X is a mapping between a router in $p_{prim}$ and a set of redundant sub-paths starting from the router; the RR configuration includes a maximum number of retransmission times $\eta$, a deviation coefficient $\alpha$, a maximum number of redundant sub-paths $\beta$ of a single router, and a maximum allowable end-to-end delay D; the deviation coefficient $\alpha$ is a sum of a maximum queuing time and a maximum processing time when a data packet arrives at each router node; the network topology $G=(R, L^o)$, where R is a set of NDN routers and $L^o$ is a set of links;

the RR vector generation module obtains an intermediate calculation result according to the input network topology, the RR configuration and the current router, and sends the intermediate calculation result to the RR communication pair generation module together with the network topology, the maximum number of retransmission times and the deviation coefficient to obtain a preselected path p of redundant sub-paths, and finally generates a RR vector $(prev_1, X^o)$ corresponding to the current router; $prev_1$ is used for a last hop router of each router in the network; the intermediate calculation result includes a source router node $r_v$, a destination router node set X', an excluded invalid link set $\hat{L}$, an excluded as much as possible invalid link set $\check{L}$, a maximum delay $\tau^l_{max}$ of a current link, a total delay $\tau_{prim}$ of a current primary path and a maximum allowable retransmission delay $\tau_{retrans}^{max}$;

the RSP path generation module generates a maximum non-overlapping path, as the a preselected path p, from the source router node to all nodes in the destination router node set according to the network topology, the maximum number of retransmission times, the deviation coefficient and the intermediate calculation result provided by the RR vector generation module;

the RR communication pair generation module outputs Y to generate a resilient route according to the input RR configuration, the current router, the destination router, and the RR vector generated by the RR vector generation module.

Further, the RR vector generation module is specifically configured to:
(a1) add all routers in the network to a heap $q_1$; traverse the routers in the heap $q_1$, and take out the router $r_u$ with a current minimum packet loss rate L in the current heap $q_1$ every time;
(a2) for an output link $l_{uv}$ of $r_u$ extracted in step (a1), obtain a router $r_v$ opposite to $r_u$ on $l_{uv}$; traverse the router $r_v$ opposite to $r_u$, searching for all path sequences from $r_j$ to $r_u$ according to $prev_1$, and take $r_v$ as a next path node of $r_u$ to obtain the current primary path; the total delay $\tau_{prim}$ of each primary path cannot exceed the maximum allowable end-to-end delay D, and $prev_1$ records a last hop router of each router;

(a3) for each primary path, call the RSP path generation module to obtain the redundant sub-path set $P_{rsp}$ with $r_v$ as a starting point; there are no more than β redundant sub-paths in $P_{rsp}$ and redundant sub-paths do not overlap as much as possible; the current minimum packet loss rate of $r_v$ should be reduced after adding the redundant sub-paths;

(a4) finally, obtain the updated $prev_1$ and the mapping $X^0$ between the desirable router and the redundant sub-path set with the router as a starting point to form the RR vector.

Further, the RSP path generation module is specifically configured to:

(b1) add a virtual router $r_{vir}$ in the network to make $r_{vir}$ bidirectionally connect to each point $r_{v,s}$ in X', with both a connection delay and a packet loss rate being zero; push all routers in the current network into a heap $q_2$; traverse the routers in the heap $q_2$, and take out a router $r_v$ with a smallest value of ψ' from the current heap $q_2$ every time;

(b2) traverse an output link $l_{wx}$ of $r_w$ extracted in step (b1) and an opposite node $r_x$; select redundant sub-path links and nodes under the condition that a logarithmic value of a reliability should be as large as possible; the redundant sub-paths cannot pass through the link in the primary path, and the selected redundant sub-path links cannot make a retransmission delay of the node exceed the maximum allowable retransmission delay; the selected redundant sub-path links should make the logarithmic value of the reliability of the node larger; when a link is repeatedly considered as a redundant sub-path link, the overlapping of redundant sub-paths can be avoided as much as possible by minimizing the logarithmic value of the reliability of the link;

(b3) select, by $prev_2$, the redundant sub-path links and record, by the node, a last hop router according to step (b2), and search for a router sequence from $r_v$ to $r_{vir}$ according to $prev_2$, $r_v$ can reach any node in X' through $r_{vir}$; and then remove $r_{vir}$ to obtain the preselected path p;

(b4) finally, feedback the preselected path p and a packet loss rate $\epsilon_{data}$ and a retransmission timeout $\theta_r(p)$ of the redundant sub-paths in the case of r retransmissions to the resilient route vector generation module.

Further, the RR communication pair generation module is specifically configured to: search for the primary path from $r_j$ to $r_k$ according to $prev_1$ output by the RR vector generation module, and obtain the mapping between a primary path router and a redundant sub-path set starting from the router from the mapping $X^0$ to obtain the output Y of the system.

Further, the RR vector generation module is specifically configured to:

(1.1) initialize five hash functions: $L[r_i]$ is a current minimum packet loss rate of $r_i$, $\psi[r_i]$ is a RR packet loss rate of $r_i$, $\phi[r_i]$ is a maximum estimated packet loss rate from an upstream router of $r_i$ to $r_i$ in the primary path when multiple retransmission paths are considered, $T_{prim}[r_i]$ is a primary path delay of $r_i$, and $T[r_i]$ represents a RR delay of $r_i$; where $r_i$ is the $i^{th}$ router in R, and i=1~n;

(1.2) under the initial condition, $L=[1.0]_{1\times n}$, $\psi=[1.0]_{1\times n}$, $\phi=[0]_{1\times n}$, $T_{prim}[0]_{1\times n}$, $T=[0]_{1\times n}$; let $L[r_j]=0$, $\psi[r_j]=1$, $\phi[r_j]=0$, $T_{prim}[r_j]=0$, $T[r_j]=0$;

(1.3) initialize the hash functions: $P_{rsp}(r_i)$ is the set of redundant sub-paths starting from $r_i$, and $X^0$ is the mapping between $r_i$ on the current primary path and the redundant sub-path set $P_{rsp}(r_i)$ starting from $r_i$;

(1.4) create a Fibonacci heap $q_1$ to sort routers, add $r_i \in R$ to the heap $q_1$, and sort the routers according to the value of $L[r_i]$ from small to large; meanwhile, create a vector $prev_1[r_i]$ to record the last hop router of $r_i$, which is initialized as $prev_1=[-1]_{1\times n}$;

(1.5) extract the first router $r_u$ in the current heap $q_1$;

(1.6) obtain a router $r_v$ opposite to $r_u$ on $l_{uv}$ for the output link $l_{uv}$ of $r_u$ extracted in step (1.5);

(1.7) if the $r_v$ obtained in step (1.6) is not in the current heap $q_1$, skip to step (1.6) to calculate the $r_v$ corresponding to a next output link until all output links $l_{uv}$ of $r_u$ have been traversed, and skip to step (1.17);

(1.8) calculate the maximum link delay $\tau^l_{max}$ of the current primary path:

$$\tau^l_{max}=(\tau(r_u,r_v)-\tau_{trans}(r_u,r_v))\times \alpha+\tau(r_u,r_v)$$

where $\tau(r_u,r_v)$ represents the total delay from $r_u$ to $r_v$, which is the sum of the transmission delay, the processing delay and the queuing delay; $\tau_{trans}(r_u,r_v)$ represents the transmission delay from $r_u$ to $r_v$;

(1.9) calculate the total delay $\tau_{prim}$ of the current primary path:

$$\tau_{prim}=T_{prim}[r_u]+\tau(r_u,r_v)$$

calculate the maximum allowable retransmission delay $\tau_{retrans}^{max}$ under the current selection of the primary path:

$$\tau_{retrans}^{max}=D-T[r_u]-\tau_{prim}$$

(1.10) if $\tau_{prim} \geq D$, skip to step (1.6) to calculate $r_v$ corresponding to another output link until all output links $l_{uv}$ of $r_u$ have been traversed, and skip to step (1.17);

(1.11) with $r_u$ as the destination router, repeatedly search the last hop router according to $prev_1$ until $prev_1[r_j]=-1$, and obtain the router sequence X' from $r_j$ to $r_u$; define $\hat{L}$ as the set of all links in the router sequence X';

(1.12) let $i_{step}=0$ for step counting, initialize the set $\tilde{L}=\{\ \}$, and circularly execute the following substeps:

(1.12.1) if $i_{step} \geq \beta$, terminate the circulation and execute step (1.13);

(1.12.2) call the RSP path generation module, and transmit the current G, $r_v$, X', $\hat{L}$, $\tilde{L}$, η, α, $\tau^l_{max}$, $\tau_{prim}$, $\tau_{retrans}^{max}$ as parameters to the RSP path generation module to obtain the preselected path p fed back by the RSP path generation module;

(1.12.3) if the p obtained in step (1.12.2) is empty or belongs to the current redundant sub-path set $P_{rsp}$, terminate the circulation and execute the step (1.13);

(1.12.4) add the p obtained in step (1.12.2) to $P_{rsp}$;

(1.12.5) if $i_{step} < \beta-1$, add all links in the p obtained in step (1.12.2) the set $\tilde{L}$;

(1.12.6) let $i_{step}=i_{step}+1$, and skip to step (1.12.1) to enter the next cycle;

(1.13) calculate the current minimum packet loss rate L' when $r_v$ is the next path node:

$$\phi^0=\in(r_u,r_v)\cdot\Pi_{p\in P_{rsp}}\epsilon_{data}(p)$$

$$L'=\phi^0\cdot\psi[r_u]+L[r_u]$$

where $\epsilon(r_u,r_v)$ represents the packet loss rate from $r_u$ to $r_v$, and $\epsilon_{data}(p)$ is the packet loss rate of the preselected path p;

(1.14) if $L' \geq L[r_v]$, skip to step (1.5) until the routers in the heap $q_1$ have been traversed, and execute step (1.18);

(1.15) update the following parameters:

$$T[r_v]=T[r_u]+i(r_u,r_v)+\tau(r_u,r_v)(1+\alpha)+\theta_r(p')\cdot(\eta-1)+\tau_d(p')$$

$$L[r_v]=L'$$

$$\phi[r_v]=\phi^0$$

$$\psi[r_v]=\psi[r_u]\cdot(1-\phi[r_u])$$

$$T_{prim}[r_v]=\tau_{prim}$$

$$prev_1[r_v]=r_u$$

where p' represents the preselected path with the smallest retransmission timeout in the set $P_{rsp}$, $\theta_r(p')$ represents the retransmission timeout of p', and $\tau_d(p')$ represents the total downlink delay of p';

(1.16) update the key value $L[r_v]$ corresponding to the router $r_v$ in the heap $q_1$, let $X^0[r_v]=P_{rsp}$; then skip to step (1.6) to calculate $r_v$ corresponding to another output link until all output links $l_{uv}$ of $r_u$ have been traversed;

(1.17) skip to step (1.5) until the routers in the heap $q_1$ have been traversed, and execute step (1.18);

(1.18) store the calculation result $(prev_1, X^0)$ in the RR vector.

Further, the RSP path generation module is specifically configured to:

(2.1) add a virtual router $r_{vir}$ in the network, so that $r_{vir}$ connects bidirectionally to each point $r_{v,s}$ in X', with both the connection delay and packet loss rate being 0, the number of routers in the current network is n'=n+1;

(2.2) create $\psi'$ and $\phi'$ vector, where $\psi'$ represents the logarithmic value of the data packet transmission success rate of the current redundant sub-path under the condition of considering the exclusion of $\tilde{L}$ as much as possible, and $\phi'$ represents the logarithmic value of the data packet transmission success rate of the current redundant sub-path under the real situation; create hash tables $\tau_{up}$ and $\tau_{down}$ to record forwarding delays of upstream and downstream paths of each router node respectively; create a hash table $\theta_{retrans}$ to record the retransmission timeout time of each router node; the initialization is as follows:

$$\psi'=[-\infty]_{1\times n'}$$

$$\phi'=[-\infty]_{1\times n'}$$

$$\tau_{up}=\{\ \}$$

$$\tau_{down}=\{\ \}$$

$$\theta_{retrans}=[0]_{1\times n'}$$

(2.3) initialize $\tau_{up}$, $\tau_{down}$, $\phi'$, $\psi'$ corresponding to $r_v$, and create a vector $prev_2$ to record the last hop router:

$$\phi'[r_v]=0$$

$$\psi'[r_v]=0$$

$$\tau_{up}[r_v]=0$$

$$\tau_{down}[r_v]=0$$

$$prev_2=[-1]_{1\times n'}$$

calculate the logarithmic value $\delta_{expell}$ of the minimum link reliability in the current network:

$$\epsilon_{expell}=\log[\min_{l_z\in L^0}((1-\epsilon(l_z))/C)]$$

where $L^0$ includes a newly added link $l=(r_{v,s},r_{vir})$ in step (2.1), and $l_z$ is the $z^{th}$ link in $L^0$; $\epsilon(l_z)$ indicates the packet loss rate of path $l_z$, and C is a constant greater than 1;

(2.4) create a Fibonacci heap $q_2$ to sort routers, and push each element in a router set R of the current network into heap $q_2$; sort the routers according to the value of $r_w$;

(2.5) if the number of routers in the current heap $q_2$ satisfies $|q_2|\leq 0$, skip to step (2.12);

(2.6) take out the first router $r_w$ from the current heap $q_2$;

(2.7) obtain the opposite node $r_x$ on the egress link $l_{wx}$ of $r_w$; if $l_{wx}\in \hat{L}$ or $r_x$ does not belong to the current heap $q_2$, skip to step (2.6) and directly enter the next circulation;

(2.8) calculate the uplink delay $\tau_{up}'$ and the downlink delay $\tau_{down}'$ of the current redundant sub-path:

$$\tau_{up}'=\tau(r_w,r_x)+\tau_{up}[r_w]$$

$$\tau_{down}'=\tau(r_x,r_w)+\tau_{down}[r_w]$$

calculate the retransmission timeout time $\theta_{retrans}'$ of the current router node:

$$\theta_{retrans}'\theta_{retrans}[r_w]\pm(\tau_{queue}(l_{wx})+\tau_{process}(l_{wx}))\times\alpha+\tau_{trans}(l_{wx})$$

where $\tau_{queue}(l_{wx})$ and $\tau_{process}(l_{wx})$ respectively represent the queuing delay and processing delay from $r_w$ to $r_x$;

calculate the retransmission delay $\tau_{retrans}'$ of the current router node:

$$\tau_{retrans}'=\tau^l_{max}+\tau_{prim}+\theta_{retrans}'\times(\eta-1)+\tau_{down}'$$

if $\tau_{retrans}'>\tau_{retrans}^{max}$, skip to step (2.6) until the routers in the heap q2 have been traversed;

(2.9) calculate the logarithmic value $\psi_1$ of the true reliability rate from $r_w$ to $r_x$ in a real situation:

$$\psi_1=\log((1-\epsilon(r_w,r_x))(1-\epsilon(r_x,r_w)))$$

(2.10) calculate the logarithmic value $\hat{\psi}_x$ of the conversion reliability rate from $r_w$ to $r_x$ when excluding $\tilde{L}$ as much as possible:

$$\hat{\psi}_x=\hat{\psi}+\psi'[r_w]$$

where if $l_{wx}\in\tilde{L}$, then $\hat{\psi}=\epsilon_{expell}$, otherwise $\hat{\psi}=\psi_1$;

(2.11) if $\hat{\psi}_x>\psi'[r_x]$, then:

$$prev_2[r_x]=r_w$$

$$\phi'[r_x]=\hat{\psi}_x$$

$$\psi'[r_x]=\psi_1+\psi'[r_w]$$

then, the $r_x$ in the heap $q_2$ is updated according to its corresponding key value $\psi'[r_x]$; and update $\tau_{up}[r_x]$ and $\tau_{down}[r_x]$:

$$\tau_{up}[r_x]=\tau(r_w,r_x)+\tau_{up}[r_w]$$

$$\tau_{down}[r_x]=\tau(r_x,r_w)+\tau_{down}[r_w]$$

if $\hat{\psi}_x\leq\psi'[r_x]$, skip to step (2.6) until the routers in the heap $q_2$ have been traversed, and execute step (2.12);

(2.12) take $r_{vir}$ as the destination router, repeatedly search the last hop router according to $prev_2$ until $prev_2[r_v]=-1$, and obtain the router sequence $(r_v,\ldots,r_{vir})$ from $r_v$ to $r_{vir}$; and then remove $r_{vir}$ to obtain the preselected path p;

(2.13) calculate the packet loss rate $\epsilon_{data}$ and retransmission timeout time $\theta_r(p)$ of the redundant sub-path when $r_v$ arrives at $r_{vir}$ in a case of $\eta$ retransmissions:

$$\epsilon_{one-way} = 1 - e^{\psi'[r_{vir}]}$$

$$\epsilon_{data}(p) = \epsilon_{one-way}^{\eta}$$

$$\theta_r(p) = \alpha \cdot (\tau_{up}[r_{vir}] + \tau_{down}[r_{vir}])$$

where $\epsilon_{one-way}$ represents the one-way packet loss rate of the redundant sub-path from $r_v$ to $r_{vir}$;

(2.14) remove $r_{vir}$ from G;

(2.15) feedback $(p, \epsilon_{data}(p), \theta_r(p))$ to the RR vector generation module.

Further, the RR communication pair generation module is specifically configured to:

(3.1) take $r_k$ as the destination router, repeatedly search the last hop router from $prev_1$ of the RR vector output by the RR vector generation module until $prev_1[r_j] = -1$, and obtain a router sequence from $r_j$ to $r_k$ as the primary path;

(3.2) create a hash table X={ }, obtain $P_{rsp}(r_p)$ corresponding to $r_p$ from $X^0$ of the RR vector output by the RR vector generation module for each router $r_p$ in the $p_{prim}$ obtained in step (3.1), and put the $P_{rsp}(r_p)$ obtained each time into X;

(3.3) output $Y = \{p_{prim}, X\}$.

The present disclosure has the following beneficial effects: the present disclosure makes full use of the mesh network and ring network structure of the power grid, and provides a resilient route (RR) generation system, the resilient route of each communication pair includes a corresponding primary path and a plurality of redundant sub-paths, the lost data packet in the current router can be directly recovered from the upstream router of the resilient route, and the optimal RR selection can maximize the success rate of retransmission of the lost data packet, thereby maximizing the network reliability; The method can be widely applied to the phasor measurement communication system of a power grid based on NDN, generates resilient routes for routers, and ensures the safe and stable operation of the power grid.

DESCRIPTION OF EMBODIMENTS

The present disclosure relates to a resilient route generation system for reliable communication of a phasor measurement system of a power grid. In view of the business characteristics of phasor measurement of the power grid, a resilient route (RR) generation system is given by fully utilizing the mesh network and ring network structures of a power grid, which can be deployed in NDN routers. Based on the network topology provided by NDN, the system can calculate RR, so that the routers can transmit data according to PP, such as data packet loss, and the routers can request the upstream routers on their PP to retransmit the lost data packets through RSP, so as to realize the recovery of the packets and maximize the success rate of retransmission of the lost packets and the network reliability.

Assuming that the network is formally defined as:

$$G = (R, L^0)$$

$$R = \{r_1, r_2, \ldots, r_n\}$$

$$L^0 = \{l_1, l_2, \ldots, l_m\}$$

where R is a set of NDN routers, $r_i$ is the $i^{th}$ router in R, and i=1~n; a phasor measurement unit PMU is connected with a source router, and a phasor measurement concentrator PDC is connected with a destination router; $L^0$ is a set of links $l_z$, $l_z \in L^0$, z=1~m, and m is the number of links in the current network.

Figure 1:
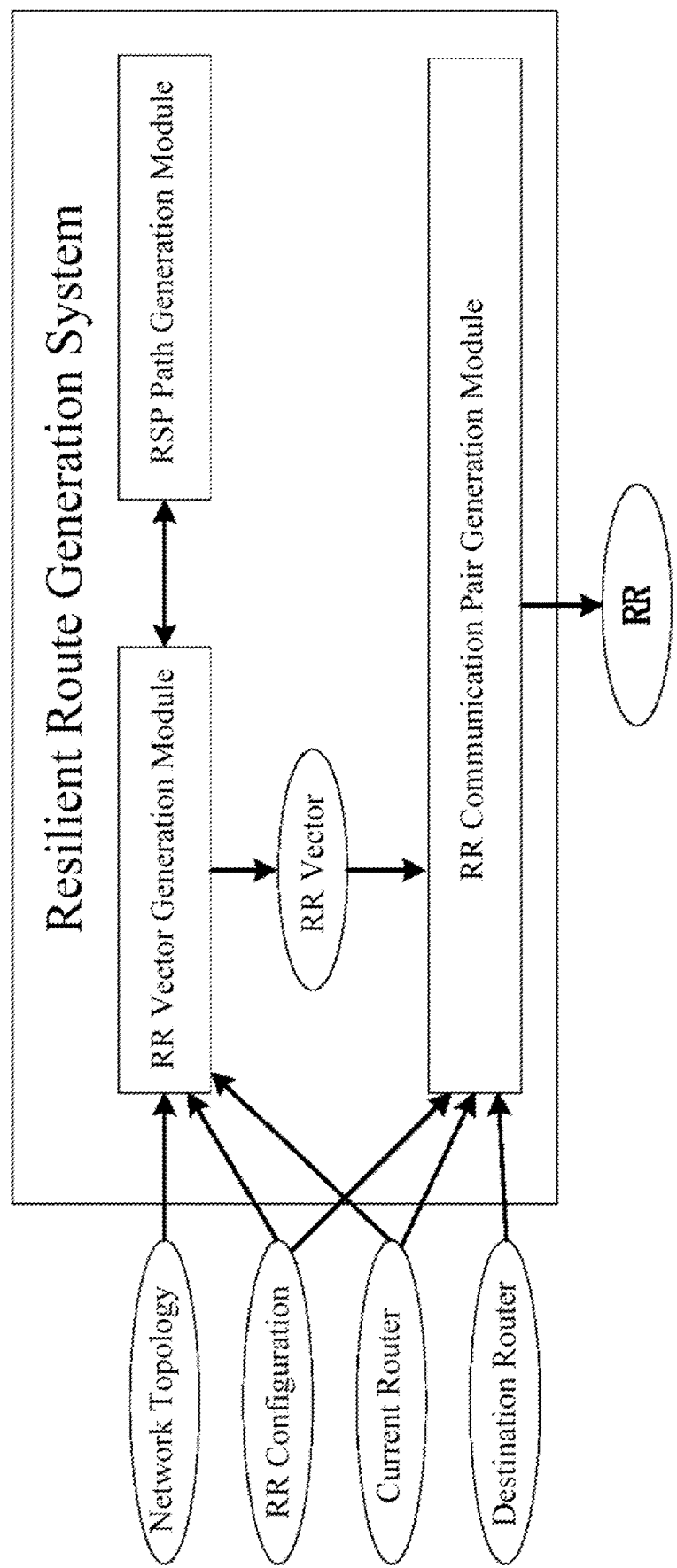
FIG. 1 is an architecture diagram of a resilient route generation system.

FIG. 1 shows the architecture of the resilient route generation system, which is mainly composed of a RR vector generation module, a RR communication pair generation module and a RSP path generation module. A RR vector is a storage structure for storing intermediate calculation results. The input of the resilient route generation system includes a network topology G, a RR configuration, a current router and a destination router, and the output is RR, the RR configuration includes a maximum number of retransmission times $\eta$, a deviation coefficient $\alpha$, a maximum number of redundant sub-paths $\beta$ of a single router, and a maximum allowable end-to-end delay D; the deviation coefficient $\alpha$ is the sum of a maximum queuing time and a maximum processing time when the data packet arrives at each router node. The resilient route RR is defined as Y:

$$Y = \{p_{prim}, X\}$$

$$X = \{r_i \rightarrow P_{rsp}(r_i) | r_i \in p_{prim}\}$$

where $p_{prim}$ is a primary path from the current router to the destination router, which represents the sequence of routers on the primary path; $P_{rsp}(r_i)$ is a RSP set whose endpoint begins with $r_i \in p_{prim}$; X is a mapping of all $r_i \in p_{prim}$ to a corresponding $P_{rsp}(r_i)$, i.e., $X[r_i] = P_{rsp}(r_i), r_i \in P_{prim}$.

I. RR Vector Generation Module

The module generates a RR vector corresponding to $r_j$ of the current router according to the network topology, the RR configuration and the current router, and it configured to: firstly, add all routers in the network to a heap $q_1$; traverse the routers in the heap $q_1$, and take out the router $r_u$ with a current minimum packet loss rate L in the current heap $q_1$ every time; then, for an output link $l_{uv}$ of $r_u$ extracted in step (a1), obtain a router $r_v$ opposite to $r_u$ on $l_{uv}$; traverse the router $r_v$ opposite to $r_u$, searching for all path sequences from $r_j$ to $r_u$ according to $prev_1$, and take $r_v$ as a next path node of $r_u$ to obtain the current primary path; the total delay $\tau_{prim}$ of each primary path cannot exceed the maximum allowable end-to-end delay D, and $prev_1$ records a last hop router of each router; afterwards, for each primary path, call the RSP path generation module to obtain the redundant sub-path set $P_{rsp}$ with $r_v$ as a starting point; there are no more than $\beta$ redundant sub-paths in $P_{rsp}$ and redundant sub-paths do not overlap as much as possible; the current minimum packet loss rate of $r_v$ should be reduced after adding the redundant sub-paths; finally, obtain the updated $prev_1$ and the mapping $X^0$ between the desirable router and the redundant sub-path set with the router as a starting point to form the RR vector. The specific steps are as follows:

(1.1) Five hash functions L, $\psi$, $\phi$, $T_{prim}$ and T are initialized, the key values of these hash functions are corresponding routers, and the result mapped is a certain floating point value. For any $r_i \in R$, $L[r_i]$ is a current minimum packet loss rate of the router $r_i$, $\psi[r_i]$ is a RR packet loss rate of the router $r_i$, $\phi[r_i]$ is a maximum estimated packet loss rate from an upstream router of $r_i$ to the router $r_i$ in the primary path when multiple retransmission paths are considered, $T_{prim}[r_i]$ is a primary path delay of the router $r_i$, and $T[r_i]$ represents a RR delay of $r_i$; where $T[r_i]$ covers the retransmission time superposition value of each router in the path.

(1.2) Under the initial condition, $L=[1.0]_{1\times n}$, $\psi=[1.0]_{1\times n}$, $\phi=[0]_{1\times n}$, $T_{prim}=[0]_{1\times n}$, $T=[0]_{1\times n}$; let $L[r_j]=0$, $\psi[r_j]=1$, $\phi[r_j]=0$, $T_{prim}[r_j]=0$, $T[r_j]=0$;

(1.3) A hash function $P_{rsp}$ is initialized, whose key value is a certain router $r_i$, and the mapped result is a set of paths composed of RSPs, where the starting point of each RSP is $r_i$ and the ending point is a router other than $r_i$.

The created hash function $X^0$ represents a mapping from the router $r_i$ on the current primary path to the set $P_{rsp}(r_i)$ corresponding to the redundant sub-path starting from $r_i$.

(1.4) A Fibonacci heap $q_1$ is created to sort routers, all routers in the set R are added to the heap $q_1$, and are sorted according to the value of $L[r_i]$ from small to large; meanwhile, a vector $prev_1[r_i]$ is created to record the last hop router of $r_i$, which is initialized as $prev_1=[-1]_{1\times n}$;

(1.5) The first router $r_u$ in the current heap $q_1$ is extracted; when the heap $q_1$ is empty, it means that all routers in the heap $q_1$ have been traversed, and skip to the step (1.18).

(1.6) For each output link $l_{uv}$ of $r_u$ extracted in step (1.5), the router $r_v$ opposite to $r_u$ on the output link $l_{uv}$ is calculated. Perform the iterative process of steps (1.7) to (1.16) until all links $l_{uv}$ of $r_u$ are traversed, and then skip to step (1.17) after the iteration.

If the $r_v$ obtained in step (1.6) is not in the current heap $q_1$, skip to step (1.6) to calculate the $r_v$ corresponding to a next output link;

The maximum link delay $\tau'_{max}$ of the current primary path is calculated as below:

$$\tau'_{max}=(\tau(r_u,r_v)-\tau_{trans}(r_u,r_v))\times\alpha+\tau(r_u,r_v)$$

where $\tau(r_u,r_v)$ represents the total delay from $r_u$ to $r_v$, which is the sum of the transmission delay, the processing delay and the queuing delay; $\tau_{trans}(r_u,r_v)$ represents the transmission delay from $r_u$ to $r_v$;

(1.9) The total delay $\tau_{prim}$ of the current primary path is calculated:

$$\tau_{prim}=T_{prim}[r_u]+\tau(r_u,r_v)$$

where $T_{prim}[r_u]$ indicates the primary path delay of the router $r_u$.

The maximum allowable retransmission delay $\tau_{retrans}^{max}$ under the current selection of the primary path is calculated:

$$\tau_{retrans}^{max}=D-T[r_u]-\tau_{prim}$$

where D is the maximum allowable end-to-end delay.

(1.10) If $\tau_{prim}\geq D$, skip to step (1.6) to calculate $r_v$ corresponding to another output link until all output links $l_{uv}$ of $r_u$ have been traversed, and skip to step (1.17);

(1.11) with $r_u$ as the destination router, the last hop router of the last search result is repeatedly searched according to $prev_1$, and the router sequence $X'$ from $r_j$ to $r_u$ is obtained, which is specifically as below:

establishing a sequence $X'$, obtaining the last hop router $prev_1[r_u]$ of $r_u$ according to $prev_1$, and adding it to the sequence $X'=(prev_1[r_u])$; then finding the last hop router $prev_1[prev_1[r_u]]$ of $prev_1[r_u]$ from $prev_1$, adding it to the current sequence and putting it in the first bit $X'=(prev_1[prev_1[r_u]],prev_1[r_u])$; according to $prev_1$, repeating the operation of searching for the last hop router, adding it to the current sequence $X'$ and putting it in the first bit until the obtained last hop router $prev_1[r_j]$ is $-1$, stopping the cyclic operation and not putting $-1$ into the sequence $X'$; adding the destination router $r_u$ to the current sequence $X'$ and putting it in the last bit, $X'=(r_j, \ldots, r_u)$.

$\hat{L}$ is defined to be a set of all links in the current primary path corresponding to the sequence $X'$.

(1.12) Let the variable $P_{rsp}=(\ )$ to be used to record the generated RSP. Let $i_{step}=0$, to be used for step counting. $\tilde{L}=\{\ \}$ is a set of links to be excluded as much as possible, and the following steps are executed circularly:

(1.12.1) If $i_{step}\geq\beta$, the circulation is terminated and step (1.13) is executed.

(1.12.2) The RSP path generation module is called, and the current G, $r_v$, $X'$, $\hat{L}$, $\tilde{L}$, $\eta$, $\alpha$, $\tau'_{max}$, $\tau_{prim}$ and $\tau_{retrans}^{max}$ are passed as parameters to the RSP path generation module to obtain the corresponding preselected path p.

(1.12.3) If the p generated in step (1.12.2) is empty or belongs to the current RSP set $P_{rsp}$, the circulation is terminated and step (1.13) is executed.

(1.12.4) The p generated in step (1.12.2) is added to the set $P_{rsp}$.

(1.12.5) If $i_{step}<\beta-1$, all links in the p generated in step (1.12.2) are added to the set $\tilde{L}$.

(1.12.6) Let $i_{step}=i_{step}+1$, and skip to step (1.12.1) to enter the next cycle.

(1.13) Calculation:

$$\phi^0=\epsilon(r_u,r_v)\cdot\Pi_{p\in P_{rsp}}\epsilon_{data}(p)$$

$$L'=\phi^0\cdot\psi[r_u]+L[r_u]$$

where p' is an intermediate variable, and $\epsilon(r_u,r_v)$ indicates the packet loss rate of a single link from $r_u$ to $r_v$; $\epsilon_{data}(p)$ is the packet loss rate of p under the condition of $\eta$ retransmissions; $L'$ represents the current minimum packet loss rate when $r_v$ is selected as the next path node, $\psi[r_u]$ is the RR packet loss rate of the router $r_u$, and $L(r_u)$ is the current minimum packet loss rate of the router $r_u$.

(1.14) If $L\geq L[r_v]$, skip to step (1.5) to extract the next router $r_u$; otherwise, continue to execute step (1.15); where $L[r_v]$ is the current minimum packet loss rate of the router $r_v$.

(1.15) The following parameters are updated:

$$T[r_v]=T[r_u]+\tau(r_u,r_v)+\tau(r_u,r_v)\cdot(1+\alpha)+\theta_r(p')\cdot(\eta-1)+\tau_d(p')$$

$$L[r_v]=L'$$

$$\phi[r_v]=\phi^0$$

$$\psi[r_v]=\psi[r_u]\cdot(1-\phi[r_u])$$

$$T_{prim}[r_v]=\tau_{prim}$$

$$prev_1[r_v]=r_u$$

where p' represents the preselected path with the smallest retransmission timeout in the set $P_{rsp}$, $\theta_r(p')$ represents the retransmission timeout of p', and $r_d(p')$ represents the total downlink delay of p'; $\psi[r_v]$ is the RR packet loss rate of the router $r_v$; $T_{prim}[r_v]$ indicates the primary path delay of the router $r_v$; $prev_1[r_v]$ is the last hop router of $r_v$.

(1.16) The operation is updated according to the standard key value of the Fibonacci heap, the key value $L[r_v]$ corresponding to the router $r_v$ in heap $q_1$ is updated; let $X^0[r_v]=P_{rsp}$, which means that the RSP set corresponding to a starting point of $r_v$ is $P_{rsp}$. Then skip to step (1.6) to calculate the $r_v$ corresponding to another link.

(1.17) Skip to step (1.5) until the routers in the heap $q_1$ have been traversed, the circulation ends, and step (1.18) is executed.

(1.18) The calculation result (prev$_1$,X$^O$) is assigned to the RR vector of the system.

II. RSP Path Generation Module

The module generates a maximum non-overlapping path from the router $r_v$ to all nodes in X' according to G, $r_v$, X', $\hat{L}$, $\tilde{L}$, $\eta$, $\alpha$, $\tau^l_{max}$, $\tau_{prim}$, $\tau_{retrans}^{max}$, where $\tilde{L}$ is a set of excluded invalid links, $\hat{L}$ is a set of links excluded from network topology G as much as possible. Firstly, a virtual router $r_{vir}$ is added in the network, so that $r_{vir}$ can be bidirectionally connected to each point $r_{v,s}$ in X', and both the connection delay and packet loss rate are 0; all routers in the current network are pushed into the heap $q_2$; the routers in the heap $q_2$ are traversed, and a router $r_w$ with the smallest $\psi'$ value is taken from the current heap $q_2$ every time; then, the output link $l_{wx}$ of the extracted $r_w$ and the opposite node $r_x$ are traversed; the redundant sub-path links and nodes are selected under the condition that the logarithmic value of the reliability should be as large as possible; the redundant sub-paths cannot pass through the link in the primary path, and the selected redundant sub-path links cannot make the retransmission delay of the node exceed the maximum allowable retransmission delay; the selected redundant sub-path links should make the logarithmic value of node reliability become larger; when a link is repeatedly considered as a redundant sub-path link, the overlapping of redundant sub-paths can be avoided as much as possible by minimizing the logarithmic value of the reliability of the link; prev$_2$ is configured to record the last hop router according to the selected redundant sub-path links and nodes, and then search according to prev$_2$ to get the router sequence from $r_v$ to $r_{vir}$, and $r_v$ can reach any node in X' through $r_{vir}$; and then $r_{vir}$ is removed to obtain a preselected path p; finally, the preselected path p, the packet loss rate $\epsilon_{data}$ and retransmission timeout $\theta_r(p)$ of the redundant sub-paths in the case of $\eta$ retransmissions are fed back to the RR vector generation module. The generation steps are as follows:

(2.1) A virtual router $r_{vir}$ is added in G, and the router is bidirectionally connected to each point $r_{v,s}$ in X', and the connection delay and packet loss rate are both 0. The adding method is as follows:

$$G=G\cup\{l=(r_{v,s},r_{vir})r_{v,s}\in X'\}$$

$$n'=|R|+1$$

where $r_{v,s}$ represents the opposite router of the s$^{th}$ RSP path of the router $r_{vir}$; n' indicates the number of routers in the current network, | | indicates modulo, and |R| indicates the number of routers.

(2.2) $\psi'$ and $\phi'$ vectors are created and their values are initialized to negative infinity. $\psi'$ represents the logarithmic value of the data packet transmission success rate corresponding to the current RSP under the condition of considering the exclusion of $\hat{L}$ as much as possible, in which the excluded link error rate will increase to $\epsilon_{expell}$; $\phi'$ indicates a logarithmic value of the success rate of data packet transmission corresponding to the RSP in the current real situation; two hash tables $\tau_{up}$ and $\tau_{down}$ are created to record forwarding delays of upstream and downstream paths of each router node respectively; a retransmission timeout hash table $\theta_{retrans}$ of each router node is created as follows:

$$\psi'=[-\infty]_{1\times n'}$$

$$\phi'=[-\infty]_{1\times n'}$$

$$\tau_{up}=\{\}$$

$$\tau_{down}=\{\}$$

$$\theta_{retrans}=[0]_{1\times n'}$$

(2.3) The values of $\tau_{up}$, $\tau_{down}$, $\phi'$ and $\psi'$ corresponding to the router $r_v$ are initialized to 0, and a prev$_2$ vector is created to record the previous hop router. $\epsilon_{expell}$ is the logarithmic value of the minimum link reliability of $L^O$ appearing in the current network G:

$$\phi'[r_v]=0$$

$$\psi'[r_v]=0$$

$$\tau_{up}[r_v]=0$$

$$\tau_{down}[r_v]=0$$

$$prev_2=[-1]_{1\times n'}$$

$$\epsilon_{expell}=\log[\min_{l_z\in L^O}((1-\epsilon(l_z))/C)]$$

where $\epsilon(l_z)$ represents the packet loss rate of the path $l_z$, and C is a constant greater than 1; at this time, $L^O$ includes the newly added link 1 in step (2.1).

(2.4) q2 is initialized into a standard Fibonacci heap, and the key value of the heap $\psi'$ is the value in $\psi'$. Then, each element in the router set R of the current network is pushed into the heap $q_2$; the routers in the heap $q_2$ are sorted according to the $\psi'$ value from small to large. The initial $\psi'[r_v]=0$ is the minimum.

(2.5) If the number of routers in the current heap $|q_2|\leq 0$, skip to step (2.12).

(2.6) The first router $r_w$ is taken out from the current heap $q_2$. Steps (2.7) to (2.11) are cyclically executed for each egress link $l_{wx}$ of $r_w$.

(2.7) The opposite node $r_x$ of $r_w$ on the link $l_{wx}$ is obtained. If $l_{wx}\in\hat{L}$ or $r_x$ is not in the heap $q_2$, skip to step (2.6) and directly enter the next circulation.

(2.8) Firstly, the uplink delay $\tau_{up}'$ and the downlink delay $\tau_{down}'$ of the current RSP are calculated, which is specifically as follows:

$$\tau_{up}'=\tau(r_w,r_x)+\tau_{up}[r_w]$$

$$\tau_{down}'=\tau(r_x,r_w)+\tau_{down}[r_w]$$

where $\tau(r_w,r_x)$ represents the total delay from $r_w$ to $r_x$, that is, the sum of a transmission delay, a processing delay and a queuing delay.

Then the retransmission timeout time $\theta_{retrans}'$ of the current router node is calculated:

$$\theta_{retrans}'=\theta_{retrans}[r_w]+(\tau_{queue}(l_{wx})+\tau_{process}(l_{wx}))\times\alpha+\tau_{trans}(l_{wx})$$

where $\tau_{queue}(l_{wx})$ and $\tau_{process}(l_{wx})$ represent the queuing delay and processing delay from r to $r_x$, respectively.

Finally, the retransmission delay $\tau_{retrans}'$ of the current router node is calculated. If $\tau_{retrans}'>\tau_{retrans}^{max}$, skip to step (2.6) until the routers in the heap $q_2$ have been traversed:

$$\tau_{retrans}'=\tau^l_{max}+\tau_{prim}+\theta_{retrans}'\times(\eta-1)+\tau_{down}'$$

(2.9) The logarithmic value $\bar{\psi}_x$ of the true reliability from $r_w$ to $r_x$ in real situation is calculated:

$$\psi_1=\log((1-\epsilon(r_w,r_x))(1-\epsilon(r_x,r_w)))$$

(2.10) The logarithmic value $\hat{\psi}_x$ of the conversion reliability from $r_w$ to $r_x$ when calculating exclusion of L as much as possible:

$$\hat{\psi}_x=\hat{\psi}+\psi'[r_w]$$

where if $1_{wx} \in \tilde{L}$, then $\hat{\psi} = \epsilon_{expell}$; otherwise $\hat{\psi} = \psi_1$.

(2.11) If $\widehat{\psi_x} > \psi'[r_x]$, then:

$$prev_2[r_x] = r_w$$

$$\phi'[r_x] = \widehat{\psi_x}$$

$$\psi'[r_x] = \psi_1 + \psi'[r_w]$$

Then, $r_x$ in the heap $q_2$ is updated according to its corresponding key value $\psi'[r_x]$. And $\tau_{up}[r_x]$ and $\tau_{down}[r_x]$ are updated:

$$\tau_{up}[r_x] = \tau(r_w, r_x) + \tau_{up}[r_w]$$

$$\tau_{down}[r_x] = \tau(r_x, r_w) + \tau_{down}[r_w]$$

where $\tau(r_w, r_x)$ represents the total delay from $r_w$ to $r_x$. $r_w$ extracted next time in step (2.6) is $r_x$ here.

If $\widehat{\psi_x} \leq \psi'[r_x]$, skip to step (2.6) until the routers in the heap q2 have been traversed, and execute step (2.12);

(2.12) The path from $r_v$ to $r_{vir}$ node is extracted from $prev_2$, to obtain the preselected path p composed of a router sequence, which is specifically:

creating a sequence p, taking $r_{vir}$ as the destination node, obtaining the last hop router $prev_2[r_{vir}]$ of $r_{vir}$ according to $prev_2$, and adding it to the sequence $p = (prev_2[r_{vir}])$; then finding the last hop router $prev_2[prev_2[r_{vir}]]$ of $prev_2[r_{vir}]$ in $prev_2$, adding it to the current sequence and put it in the first bit $p = (prev_2[prev_2[r_{vir}]], prev_2[r_{vir}])$; according to $prev_2$, repeated the operation of searching for the last hop router, adding it to the current sequence P and putting it in the first bit, until the obtained $prev_1[r_v]$ of the last hop router is −1, stopping the circulation operation, and obtaining $p = (r_v, \ldots, r_{vir})$;

then remove $r_{vir}$ from p.

(2.13) Calculation:

$$\epsilon_{one-way} = 1 - e^{\psi'[r_{vir}]}$$

$$\epsilon_{data}(p) = \epsilon_{one-way}^{\eta}$$

$$\theta_r(p) = \alpha \cdot (\tau_{up}[r_{vir}] + \tau_{down}[r_{vir}])$$

where $\epsilon_{one-way}$ indicates the one-way packet loss rate of the RSP from $r_v$ to $r_{vir}$, $\epsilon_{data}(p)$ indicates the packet loss rate of the RSP from $r_v$ to $r_{vir}$ in the case of $\eta$ retransmissions, and $\theta_r(p)$ indicates the retransmission timeout from $r_v$ to $r_{vir}$.

(2.14) $r_{vir}$ is removed from G.

(2.15) The calculated $p_{rsp} = (p, \epsilon_{data}(p), \theta_r(p))$ is returned to the caller, i.e., the RR vector generation module.

III. RR Communication Pair Generation Module

The module generates a resilient route RR according to a RR vector, a RR configuration, a current router and a destination router. Firstly, the primary path from $r_j$ to $r_k$ is searched according to $prev_1$ output by the RR vector generation module, and the mapping of a primary path router and the redundant sub-path set starting from it is obtained from mapping $X^0$, and an output Y of the system is obtained. The steps are as follows:

(3.1) The primary path $p_{prim}$ between the source router $r_j$ and the destination router $r_k$ from $prev_1$ of the RR vector. The extraction method is as follows:

establishing a sequence $p_{prim}$, taking $r_k$ as the destination router, obtaining the last hop router $prev_1[r_k]$ of $r_k$ according to $prev_1$, and adding it to a sequence $p_{prim} = (prev_1[r_k])$; then find the last hop router $prev_1[prev_1[r_k]]$ of $prev_1[r_k]$ from $prev_1$, and adding it to the current sequence and putting it in the first bit $p_{prim}(prev_1[prev_1[r_k]], prev_1[r_k])$; according to $prev_1$, repeating the operation of searching for the last hop router, adding it to the current sequence $p_{prim}$ and putting it in the first bit until the obtained $prev_1[r_j]$ of the last hop router is −1, stopping the cyclic operation and not putting −1 into the sequence $p_{prim}$; adding the destination router $r_k$ to the current sequence $p_{prim}$ and putting it in the last bit, $p_{prim} = (r_j, \ldots, r_k)$.

(3.2) according to the input RR vector ($prev_1, X^0$) of this module and the prim calculated in step (3.1), the execution result Y of this module, that is, the RR path from $r_j$ to $r_k$ is calculated; the calculation method is as follows:

first, creating an empty hash table X={ }; for each router $r_p$ in $p_{prim}$, obtaining $P_{rsp}(r_p)$ corresponding to $r_p$ from $X^0$, $X = X \cup \{r_p \rightarrow P_{rsp}(r_p) \mid r_p = p_{prim}\}$; at last, obtaining $Y = (p_{prim}, X)$.

(3.3) Y is fed back to the caller.

Figure 2:
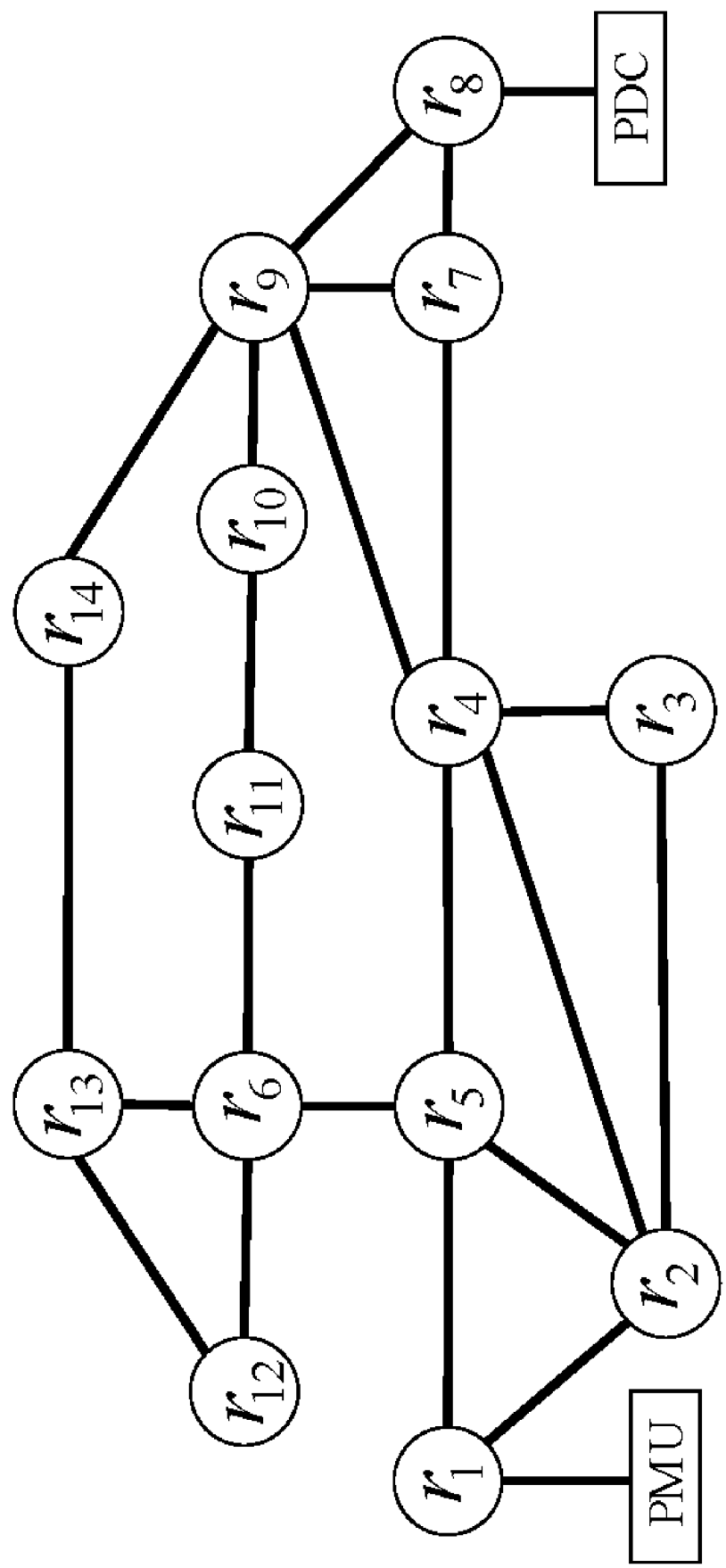
FIG. 2 is a communication network topology diagram of the power grid according to an embodiment of the present application.

An embodiment of one embodiment of the present disclosure is as follows:

It is assuming that the communication network topology of a certain power grid is constructed by the standard IEEE 14 bus (bus). FIG. 2 shows the topology of this network. Suppose that a PMU is connected to $r_1$ and A PDC is connected to $r_8$. The topology is defined as $G = (R, L^0)$, n=14 and m=19. When the NDN router is running, the network topology provided by the router is input into the resilient route generation system. It is assuming that the delay and packet loss rate of any link in the topology are 171 μs and 2% respectively; the RR configuration parameters are as follows: $\eta$=3, $\alpha$=3, $\beta$=5, D=50 ms; the current router is $r_1$; if the destination router is $r_8$, the RR generation process is as follows:

firstly, the RR vector generation module generates the corresponding RR vector according to the RR configuration, the current router, the destination router and G, and the steps are as follows:

I. RR Vector Generation Module (1.1) Five hash functions L={ }, $\psi$={ }, $\phi$={ }, T={ } and $T_{prim}$={ } are created; $L=[1.0]_{1 \times n}$, $\psi=[1.0]_{1 \times n}$, $\phi=[0]_{1 \times n}$, $T_{prim}=[0]_{1 \times n}$, $T=[0]_{1 \times n}$, then let $L(r_1)=0$, $\psi(r_1)=1$, $\phi(r_1)=0$, $T_{prim}(r_1)=0$, $T(r_1)=0$; a hash function $X^0$={ } is created.

(1.2) A standard Fibonacci heap is created as $q_1$, all routers in R are added to $q_1$, and $q_1$ sorts the routers according to the L value corresponding to each router, then $q_1 = (r_1, r_2, r_3, r_4, r_5, r_6, r_7, r_8, r_9, r_{10}, r_{11}, r_{12}, r_{13}, r_{14})$. Meanwhile, $prev_1 = [-1]_{1 \times n}$ is created.

(1.3) The router with the lowest packet loss rate is extracted from $q_1$ and recorded as $r_u$, where $r_u = r_1$, and execution is continued because $r_u$ is not empty.

(1.4) For each link $l_{uv}$ of $r_u$, such as $(r_1, r_5)$, its opposite router $r_5$ is calculated, and because $r_5$ is in q, then $\tau'_{max} = (\tau(r_1, r_5) - \tau_{trans}(r_1, r_5)) \times \alpha + \tau(r_1, r_5) = (171-167) \times 3 + 171 = 179$ μs is calculated; the maximum allowable retransmission delay $\tau_{retrans}^{max} = D - T[r_1] - \tau_{prim} = 49829$ μs is calculated, where $\tau_{prim} = 171$ μs. Since $\tau_{prim} \geq D$ is not valid, the execution will continue.

(1.5) The $prev_1$ vector converted into a vector $X' = (r_1)$ from $r_1$ to $r_1$, since $prev_1[r_1] = -1$. $\hat{L}$={ }, $\tilde{L}$={ } is calculated.

(1.6) Let the variables $P_{rsp}$=( ), $i_{step}$=0. At this time, G, $r_v$, X', $\hat{L}$, $\tilde{L}$, $\eta$, $\alpha$, $\tau'_{max}$, $\tau_{prim}$, $\tau_{retrans}^{max}$ are passed to the RSP path generation module, and the preselected path $p = (r_2, r_5, r_1)$ is obtained. Since p is not empty and does not belong to $P_{rsp}$, then $P_{rsp} = \{(p = (r_2, r_5, r_1), \epsilon_{data}(p) = 0.0000621, \tau_{down}[r_{vir}] = 342$ us, $\theta_r(p) = 716$ us)$\}$. Since $i_{step} 0 < \beta - 1 = 4$, all links in p, namely $\{(r_2, r_5), (r_5, r_1)\}$, are added to $\tilde{L}$, then $\tilde{L} = \{(r_2, r_5), (r_5, r_1)\}$, then $i_{step} = i_{step} + 1 = 1$; this step is repeated until the $i_{step} \geq \beta$, thus obtaining $P_{rsp} = \{(r_2, r_5, r_1), (r_2, r_4, r_5, r_1), (r_2, r_3, r_4, r_9, r_{14}, r_{13}, r_6, r_5, r_1)\}$.

(1.7) $\phi^0=\in(r_1, r_2) \cdot \Pi_{p \in P_{rsp}} \in_{data}(p) = 1.173292e-13$, $L'=\phi^0 \cdot \psi(r_1)+L(r_1)=(1.173292e-13) \cdot 1+0=1.173292e-13$ are calculated.

(1.8) Because $L' < L(r_2) = 1.0$, $T(r_2) = T(r_1) + \tau(r_1,r_2) + \tau(r_1,r_2) \cdot (1+\alpha) + \theta_r(p') \cdot (\eta-1) + \tau_d(p') = 7617$ μs, $L(r_1) = 1.173292e-13$, $\phi(r_2) = 1.173292e-13$, $\psi(r_2) = \psi(r_1) \cdot (1-\phi(r_1)) = 1$, $T_{prim}[r_2] = 171$ μs, $prev_1[r_2] = r_1$ are calculated.

(1.9) The key value corresponding to $r_2$ in $q_1$ is calculated, and $X^0[r_2] = P_{rsp}$.

(1.10) For each link of $r_1$, the related operation results are calculated according to the above steps (1.4) to (1.9), until all output links $l_{uv}$ of $r_u$ have been traversed.

(1.11) Skip to step (1.3), and calculate the related operation results until the routers in the heap $q_1$ have been traversed.

(1.12) Finally, $prev_1=[-1,r_1,r_4,r_5,r_1,r_5,r_4,r_7,r_4,r_{11},r_1,r_6,r_6,r_6,r_{13}]$, $X^0=\{r_2 \rightarrow (r_2,r_5,r_1), r_3 \rightarrow (r_3,r_2,r_1), r_4 \rightarrow (r_4,r_2,r_1), r_5 \rightarrow (r_5,r_2,r_1), r_6 \rightarrow (r_6,r_{11},r_{10},r_9,r_4,r_5), r_7 \rightarrow (r_7,r_9,r_4), r_9 \rightarrow (r_9,r_7,r_4), r_{10} \rightarrow (r_{10},r_9,r_4,r_5), r_{11} \rightarrow (r_{11},r_{10},r_9,r_4,r_5), r_{12} \rightarrow (r_{12},r_{13},r_6), r_{13} \rightarrow (r_{13}, r_{12},r_6), r_{14} \rightarrow (r_{14},r_9,r_4,r_5)\}$ is calculated, and $(prev_1,X^0)$ is assigned to the RR vector of this system.

II. RSP Path Generation Module

In step (1.6) of the RR vector generation module, by taking the first execution of this step as an example, the input parameters of the RSP path generation module are G, $r_v=r_2$, $X'=(1)$, $\hat{L}=\{\}$, $\tilde{L}=\{\}$, $\eta=3$, $\alpha=3$, $\tau^I_{max}=179$ ρs, $\tau_{prim}171$ μs and $\tau_{retrans}^{max}=49829$ μs, respectively, which is executed as follows:

(2.1) Because $r_{v,s}$ is each point in X', $r_{vir}$ is connected to $\{r_1\}$ (as shown in FIG. 2), and the related connection delay and packet loss rate are both 0, and the adding method is as follows: $G=G \cup \{l=(r_{v,s},r_{vir})|x_s \in X'\}$; meanwhile, $n'=|R|+1=15$ is calculated.

(2.2) $\psi'=[-\infty]_{1 \times n'}$, $\phi'=[-\infty]_{1 \times n'}$, $\tau_{up}=\{\}$ and $\tau_{down}=\{\}$ are calculated.

(2.3) Because $r_v=r_2$, $\phi'(r_2)=0$, $\psi'(r_2)=0$, $\tau_{up}[r_2]=0$, $\tau_{down}[r_2]=0$, $prev_2=[-1]_{1 \times n'}$, $\epsilon_{expell}=-1.118815$, where C=3.

(2.4) $q_2$ is initialized to a standard Fibonacci heap, and the key value of the heap is the value in $\psi'$. Then, each element in R is pushed into $q_2$, where $|q_2|=15$.

(2.5) As $|q_2|=15>0$ at this time, execution is continued.

(2.6) An element drawn from $q_2$ is named $r_w$. For example, in the first cycle, $r_w=r_2$, and for each egress link $l_{wx}$ of $r_w$, steps (2.7) to (2.11) are cyclically executed until $|q| \le 0$.

(2.7) The opposite node $r_x$ of $r_w$ on $l_{wx}$ is obtained, for example, in the first cycle, $r_x=r_3$, at this time, the execution will be continued since $l_{wx} \notin \hat{L}$ and $r_2$ is included in $q_2$.

(2.8) $\tau_{up}'$, $\tau_{down}'$, $\theta_{retrans}'$ and $\tau_{retrans}'$ are calculated. For example, in one cycle, $\tau_{up}'=171$ μs, $\tau_{down}'=171$ μs, $\theta_{retrans}'=358$ μs, $\tau_{retrans}'=1237$ μs are calculated. Since $\tau_{retrans}' \le \tau_{retrans}^{max}$, the execution will be continued.

(2.9) $\psi 1$ is calculated, for example, in the first cycle, $\psi_1 = \log((1-\epsilon(r_2,r_3))(1-\epsilon(r_2,r_3))) = -0.0404054$ is calculated.

(2.10) $\hat{\psi}_3$ is calculated, and for example, in the first cycle, since $l_{wx} \notin \hat{L}$, then $\hat{\psi}=-0.0404054$; $\hat{\psi}_3 = \hat{\psi}+\psi[r_2]=-0.0404054$ is calculated.

(2.11) The values of $prev_2[r_x]$, $\phi'[r_x]$, $\psi'[r_x]$, $\tau_{up}[r_x]$, $\tau_{down}[r_x]$ are calculated; since $\hat{\psi}_v > \psi[r_v]=-\infty$, $prev_2[r_3]=r_2$, $\phi'[r_3]=-0.0404054$, $\psi'[r_3]=\psi_1+\psi[r_2]=-0.0404054$; the heap $q_2$ is updated according to the key value corresponding to $r_3$.

(2.12) The path $p=(r_2,r_5,r_1)$ from $r_2$ to the node $r_{vir}$ is extracted from $prev_2$.

(2.13) $\epsilon_{one-way}=0.077632$, $\epsilon_{data}(p)=0.0004679$, $\theta_r(p)=\alpha \cdot (\tau_{up}[r_{vir}]+\tau_{down}[r_{vir}])=716$ μs are calculated.

(2.14) $r_{vir}$ is removed from G.

(2.15) The calculated result $p_{rsp}=(p=(r_2,r_5,r_1), \epsilon_{data}(p)=0.0000621, \tau_{down}[r_{vir}]=342$ μs, $\theta_r(p)=716$ μs) is returned to the caller.

III. RR Communication Pair Generation Module

Assuming that the RR vector and RR configuration are the same as the input of the RR vector generation module mentioned above, the source router $r_j=r_1$ and the destination router $r_k=r_8$, and the RR generation steps are as follows:

(3.1) The path between $r_1$ and $r_8$ is extracted from $prev_3$, $p_{prim}(r_1,r_5,r_4,r_7,r_8)$.

(3.2) The RR path from $r_1$ to $r_8$ is obtained by calculation:

$Y=(p_{prim}=(r_1,r_5,r_4,r_7,r_8), X=\{\{r_5 \rightarrow \{(r_5,r_2,r_1),(r_5,r_4,r_2,r_1),(r_5,r_6,r_{11},r_{10},r_9,r_4,r_3,r_2,r_1)\}, \{r_4 \rightarrow \{(r_4,r_2,r_1),(r_4,r_3,r_2,r_5),(r_4,r_9,r_{14},r_{13},r_6,r_5),(r_4,r_7,r_9,r_{10},r_{11},r_6,r_5)\}\}, \{r_7 \rightarrow \{(r_7,r_9,r_4),(r_7,r_9,r_{10},r_{11},r_6,r_5)\}\}\})$.

(3.3) At this time, the maximum data delivery delay of Y is $\tau[r_k]=18937$ μs, which meets the requirement of the maximum delay D=50 ms, and Y is fed back to the caller.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

What is claimed is:

1. A resilient route RR generation system for reliable communication in a phasor measurement system of a power grid, comprising a resilient route vector generation module, an RR communication pair generation module and a redundant sub-path (RSP) path generation module; wherein an input of the resilient route generation system comprises a network topology, a RR configuration, a current router $r_j$ and a destination router $r_k$, and an output is resilient route Y from $r_j$ to $r_k$, comprising a primary path $p_{prim}$ from $r_j$ to $r_k$ and a mapping X between a redundant sub-path set starting from a primary path router and a corresponding starting point; the RR configuration comprises a maximum number of retransmission times η, a deviation coefficient α, a maximum number of redundant sub-paths β of a single router, and a maximum allowable end-to-end delay D; the deviation coefficient α is a sum of a maximum queuing time and a maximum processing time when a data packet arrives at each router node; the network topology G comprises a router set R and a link set $L^0$;

the resilient route vector generation module obtains an intermediate calculation result according to the input network topology, the RR configuration and the current router, and sends the intermediate calculation result to the RR communication pair generation module together with the network topology, the maximum number of retransmission times and the deviation coefficient to obtain a preselected path p of redundant sub-paths, and finally generates a RR vector corresponding to the current router, including recording a sequence $prev_1$ of a last hop router and a mapping $X^0$ between a desirable router and the redundant sub-path set with the router as a starting point; the intermediate calculation result comprises a candidate redundant sub-path starting point $r_v$, a path sequence X', a path sequence link set $\hat{L}$, a historically generated redundant sub-path link set $\tilde{L}$, a current primary path link maximum delay $\tau'_{max}$, a current primary path total delay $\tau_{prim}$ and a current primary path maximum allowable retransmission delay $\tau_{retrans}^{max}$;

the RSP path generation module generates a maximum non-overlapping path, as the preselected path p, from a source router node to all nodes in a destination router node set according to the network topology, the maximum number of retransmission times, the deviation coefficient and the intermediate calculation result provided by the resilient route vector generation module;

the RR communication pair generation module outputs Y according to the input RR configuration, the current router, the destination router and the RR vector generated by the resilient route vector generation module and generates the resilient route, which comprises the following steps:

(3.1) taking $r_k$ as the destination router, repeatedly searching the last hop router from $prev_1$ of the RR vector output by the resilient route vector generation module until $prev_1[r_j]=-1$, and obtaining a router sequence from $r_j$ to $r_k$ as the primary path $p_{prim}$;

(3.2) creating a hash table X={ }, obtaining $P_{rsp}(r_p)$ corresponding to $r_p$ from $X^0$ of the RR vector output by the resilient route vector generation module for each router $r_p$ in the $p_{prim}$ obtained in step (3.1), and putting $P_{rsp}(r_p)$ obtained each time into X;

(3.3) outputting Y={$p_{prim}$,X}, generating an optimal RR, feeding back the optimal RR to a caller of the phasor measurement system of the power grid to implement a routing decision, transmitting, by a named data networking (NDN) router, data according to the primary path $p_{prim}$ through the routing decision, when a data packet is lost due to a failure of an upstream link of the NDN router, requesting, by the NDN router, an upstream router to retransmit the lost data packet through the redundant sub-path to achieve a recovery of the data packet, and maximizing, by the optimal RR, a success rate of retransmission of the lost data packet, thereby improving a reliability of substations and distribution networks.

2. The resilient route RR generation system for reliable communication in a phasor measurement system of a power grid according to claim 1, wherein the resilient route vector generation module is configured to:

(a1) add all routers in the network to a heap $q_1$; traverse the routers in the heap $q_1$, and take out the router $r_u$ with a current minimum packet loss rate L in the current heap $q_1$ every time;

(a2) for an output link $l_{uv}$ of $r_u$ extracted in step (a1), obtain a router $r_v$ opposite to $r_u$ on $l_{uv}$; traverse the router $r_v$ opposite to $r_u$, searching for all path sequences from $r_j$ to $r_u$ according to $prev_1$, and take $r_v$ as a next path node of $r_u$ to obtain the current primary path; wherein the total delay $\tau_{prim}$ of each primary path cannot exceed the maximum allowable end-to-end delay D, and $prev_1$ records a last hop router of each router;

(a3) for each primary path, call the RSP path generation module to obtain the redundant sub-path set $P_{rsp}$ with $r_v$ as a starting point; wherein, there are no more than β redundant sub-paths in $P_{rsp}$ and redundant sub-paths do not overlap as much as possible; the current minimum packet loss rate of $r_v$ should be reduced after adding the redundant sub-paths;

(a4) finally, obtain the updated $prev_1$ and the mapping $X^0$ between the desirable router and the redundant sub-path set with the router as a starting point to form the RR vector.

3. The resilient route RR generation system for reliable communication in a phasor measurement system of a power grid according to claim 2, wherein the RSP path generation module is configured to:

(b1) add a virtual router $r_{vir}$ in the network to make $r_{vir}$ bidirectionally connect to each point $r_{v,s}$ in X', with both a connection delay and a packet loss rate being zero; push all routers in the current network into a heap $q_2$; traverse the routers in the heap $q_2$, and take out a router $r_w$ with a smallest value of ψ' from the current heap $q_2$ every time;

(b2) traverse an output link $l_{wx}$ of $r_w$ extracted in step (b1) and an opposite node $r_x$; select redundant sub-path links and nodes under the condition that a logarithmic value of a reliability should be as large as possible; wherein, the redundant sub-paths cannot pass through the link in the primary path, and the selected redundant sub-path links cannot make a retransmission delay of the node exceed the maximum allowable retransmission delay; the selected redundant sub-path links should make the logarithmic value of the reliability of the node larger; when a link is repeatedly considered as a redundant sub-path link, the overlapping of redundant sub-paths can be avoided as much as possible by minimizing the logarithmic value of the reliability of the link;

(b3) select, by $prev_2$, the redundant sub-path links and record, by the node, a last hop router according to step (b2), and search for a router sequence from $r_v$ to $r_{vir}$ according to $prev_2$, wherein $r_v$ can reach any node in X' through $r_{vir}$; and then remove $r_{vir}$ to obtain the preselected path p;

(b4) finally, feed back the preselected path p and a packet loss rate $\epsilon_{data}$ and a retransmission timeout $\theta_r(p)$ of the redundant sub-paths in the case of η retransmissions to the resilient route vector generation module.

4. The resilient route RR generation system for reliable communication in a phasor measurement system of a power grid according to claim 3, wherein the RR communication pair generation module is specifically configured to search for the primary path from $r_j$ to $r_k$ according to the $prev_1$ output by the resilient route vector generation module, and obtain a mapping between a primary path router and the redundant sub-path set with the router as a starting point from the mapping $X^0$ to obtain the output Y of the system.

5. The resilient route RR generation system for reliable communication in a phasor measurement system of a power grid according to claim 4, wherein the resilient route vector generation module is specifically implemented by the following steps:

(1.1) creating a hash function: $L[r_i]$ is a current minimum packet loss rate of $r_i$, $\psi[r_i]$ is a RR packet loss rate of $r_i$, $\phi[r_i]$ is a maximum estimated packet loss rate from an upstream router of $r_i$ to $r_i$ in the primary path when multiple retransmission paths are considered, $T_{prim}[r_i]$ is a primary path delay of $r_i$, and $T[r_i]$ represents a RR delay of $r_i$, $P_{rsp}(r_i)$ is a set of redundant sub-paths with $r_i$ as a starting point, and $X^0$ is the mapping between $r_i$ and $P_{rsp}(r_i)$ on the current primary path; $prev_1[r_i]$ records a last hop router of $r_i$; where $r_i$ is an $i^{th}$ router in R, i=1~n, and n is a number of routers;

(1.2) initializing: $L=[1.0]_{1 \times n}$, $\psi=[1.0]_{1 \times n}$, $\phi=[0]_{1 \times n}$, $T_{prim}=[0]_{1 \times n}$, $T=[0]_{1 \times n}$; $prev_1=[-1]_{1 \times n}$; wherein $L[r_j]=0$, $\phi=[r_j]=0$, $T_{prim}[r_j]=0$, $T[r_j]=0$;

(1.3) adding all $r_i \in R$ to the heap $q_1$;

(1.4) taking out the router $r_u$ with the smallest L in the current heap $q_1$;

(1.5) for output link $l_{uv}$ of $r_u$ extracted in step (1.4), obtaining a router $r_v$ opposite to $r_u$ on $l_{uv}$;

(1.6) if the $r_v$ obtained in step (1.5) is not in the current heap $q_1$, skipping to step (1.5) to calculate the $r_v$ corresponding to a next output link until all output links $l_{uv}$ of $r_u$ are traversed, and skipping to step (1.17);

(1.7) calculating the maximum delay $\tau'_{max}$, the total delay $\tau_{prim}$ and the maximum allowable retransmission delay $\tau_{retrans}^{max}$ of the current primary path;

(1.8) if $\tau_{prim} \geq D$, skipping to step (1.5) to calculate $r_v$ corresponding to another $l_{uv}$ until all output links of $r_u$ are traversed, and skipping to step (1.17);

(1.9) taking $r_u$ as the destination router, repeatedly searching the last hop router according to $prev_1$, and obtaining the path sequence X' from $r_j$ to $r_u$; defining $\hat{L}$ as a set of all links in X';

(1.10) defining $i_{step}=0$ for step counting, initializing the set $\tilde{L}=\{\ \}$, and circularly executing the following sub-steps:

(1.10.1) if $i_{step} \geq \beta$, terminating the circulation and executing step (1.11);

(1.10.2) calling the RSP path generation module, and passing the current G, $r_v$, X', $\hat{L}$, $\tilde{L}$, $\eta$, $\alpha$, $\tau'_{max}$, $\tau_{prim}$ and $\tau_{retrans}^{max}$ as parameters to the RSP path generation module to obtain the preselected path p fed back by the RSP path generation module;

(1.10.3) if p obtained in step (1.10.2) is empty or belongs to the current redundant sub-path set $P_{rsp}$, terminating the circulation and executing step (1.11);

(1.10.4) adding p obtained in step (1.10.2) to $P_{rsp}$;

(1.10.5) if $i_{step} < \beta-1$, adding all links in p obtained in step (1.10.2) to the set $\tilde{L}$;

(1.10.6) defining $i_{step}=i_{step}+1$, and skipping to step (1.10.1) to enter the next cycle;

(1.11) calculating the current minimum packet loss rate L' when $r_v$ is a next path node of X';

(1.12) if $L' < L[r_v]$, updating $T[r_v]$, $L[r_v]$, $\phi[r_v]$, $\psi[r_v]$, $T_{prim}[r_v]$ and $T_{prim}[r_v]$ and recording $r_u$ as a last hop router of $r_v$; and if $L' \geq L[r_v]$, skipping to step (1.4) until the routers in the heap $q_1$ have been traversed, and executing step (1.18);

(1.13) defining $X^0[r_v]=P_{rsp}$; then skipping to step (1.5) to calculate $r_v$ corresponding to another output link until all output links $l_{uv}$ of $r_u$ have been traversed;

(1.17) skipping to step (1.4) until the routers in the heap $q_1$ have been traversed, and executing step (1.18);

(1.18) storing the calculation result ($prev_1, X^0$) in the RR vector.

6. The resilient route RR generation system for reliable communication in a phasor measurement system of a power grid according to claim 5, wherein the RSP path generation module is specifically implemented by the following steps:

(2.1) adding a virtual router $r_{vir}$ in the network to make $r_{vir}$ connect bidirectionally to each point $r_{v,s}$ in X', wherein both the connection delay and packet loss rate being 0, and the number of routers in the current network is n'=n+1;

(2.2) creating a hash function: $\psi'$ indicating a logarithmic value of a data packet transmission success rate of the current redundant sub-path under the condition of considering the exclusion of $\tilde{L}$, $\phi'$ indicates a logarithmic value of a data packet transmission success rate of the redundant sub-paths in a current real case; $\tau_{up}$ and $\tau_{down}$ respectively record the forwarding delays of the upstream and downstream paths of each router node; $\theta_{retrans}$ records a retransmission timeout time of each router node; $prev_2$ records the last hop router;

(2.3) initializing: $\psi'=[-\infty]_{1 \times n'}$, $\phi'=[-\infty]_{1 \times n'}$, $\tau_{up}=\{\ \}$, $\tau_{down}=\{\ \}$, $\theta_{retrans}=[0]_{1 \times n'}$, $prev_2=[-1]_{1 \times n'}$; wherein $\phi'[r_v]=0$, $\psi'[r_v]=0$, $\tau_{up}[r_v]=0$, $\tau_{down}[r_v]=0$;

(2.4) pushing all routers in the current network into the heap $q_2$; if the number of routers in the current heap $q_2$ satisfies $|q_2|<0$, skipping to step (2.10);

(2.5) taking out the router $r_w$ with a smallest $\psi'$ value from the current heap $q_2$;

(2.6) obtaining the opposite node $r_x$ on an egress link $l_{wx}$ of $r_w$; or if $l_{wx} \in \hat{L}$ or $r_x$ does not belong to the current heap $q_2$, skipping to step (2.5) and directly entering the next cycle;

(2.7) calculating an uplink delay $\tau_{up}'$, a downlink delay $\tau_{down}'$ of the current redundant sub-path, a retransmission timeout $\theta_{retrans}'$ and a retransmission delay $\tau_{retrans}'$ of the current router node; if $\tau_{retrans}' > \tau_{retrans}^{max}$, skipping to step (2.5) until the routers in the heap $q_2$ are traversed;

(2.8) calculating the logarithmic value of a true reliability from $r_w$ to $r_x$ in a real situation, and the logarithmic value of a conversion reliability from $r_w$ to $r_x$ when $\tilde{L}$ is excluded as much as possible;

(2.9) if $\widehat{\psi_x} > \psi'[x]$, updating $\phi'[x]$, $\psi'[x]$, $\tau_{up}[x]$, $\tau_{down}[x]$, and recording $r_w$ as the last hop router of $r_x$; and if $\widehat{\psi_x} \leq \psi'[r_x]$, skipping to step (2.5) until the routers in the heap $q_2$ are traversed, and executing step (2.10);

(2.10) taking $r_{vir}$ as the destination router, repeatedly searching the last hop router according to $prev_2$ until $prev_2[r_v]=-1$, and obtaining the router sequence $(r_v, \ldots, r_{vir})$ from Iv to $r_{vir}$; and then removing $r_{vir}$ to obtain the preselected path p;

(2.11) calculating the packet loss rate $\epsilon_{data}$ and retransmission timeout time $\theta_r(p)$ of the redundant sub-path when $r_v$ arrives at $r_{vir}$ in a case of $\eta$ retransmissions; then removing $r_{vir}$ from G; finally, feeding (p, $\epsilon_{data}(p)$, $\theta_r(p)$) back to the resilient route vector generation module.

7. The resilient route RR generation system for reliable communication in a phasor measurement system of a power grid according to claim 6, wherein:
in step (1.3), the heap $q_1$ is a Fibonacci heap, which is used to sort the routers from small to large according to the value of $L[r_i]$; and the order is updated synchronously with the value of $L[r_i]$;
in step (1.7):
when a maximum link delay $\tau^l_{max}$ of a current primary path is:

$$\tau^l_{max}=(\tau(r_u,r_v)-\tau_{trans}(r_u,r_v))\times\alpha+\tau(r_u,r_v)$$

when a total delay $\tau_{prim}$ of the current primary path is:

$$\tau_{prim}=T_{prim}[r_u]+\tau(r_u,r_v)$$

under the selection of the current primary path, the maximum allowable retransmission delay $\tau_{retrans}^{max}$:

$$\tau_{retrans}^{max}=D-T[r_u]-\tau_{prim}$$

where $\tau(r_u,r_v)$ represents a total delay from $r_u$ to $r_v$, which is the sum of a transmission delay, a processing delay and a queuing delay; $\tau_{trans}(r_u,r_v)$ represents a transmission delay from $r_u$ to $r_v$;
in step (1.9), $prev_1[r_j]=-1$;
in step (1.11), the current minimum packet loss rate L' when $r_v$ is a next path node of X':

$$\phi^0 = \epsilon(r_u,r_v)\cdot \prod_{p\in P_{rsp}} \epsilon_{data}(p)$$

$$L' = \phi^0 \cdot \psi[r_u] + L[r_u]$$

where $\epsilon(r_u,I_v)$ represents the packet loss rate from $r_u$ to $r_v$, and $\epsilon_{data}(p)$ is the packet loss rate of the preselected path p;
the update parameters of step (1.12) are as follows:

$$T[r_v]=T[r_u]+\tau(r_u,r_v)+\tau(r_u,r_v)\cdot(1+\alpha)+\theta_r(p')\cdot(\eta-1)+\tau_d(p')$$

$$L[r_v]=L'$$

$$\phi[r_v]=\phi^0$$

$$\psi[r_v]=\psi[r_u]\cdot(1-\phi[r_u])$$

$$T_{prim}[r_v]=\tau_{prim}$$

$$prev_1[r_v]=r_u$$

where p' represents a preselected path with the smallest retransmission timeout in the set $P_{rsp}$, $\theta_r(p')$ represents the retransmission timeout of p', and $\tau_d(p')$ represents the total downlink delay of p'.

8. The resilient route RR generation system for reliable communication in a phasor measurement system of a power grid according to claim 7, wherein:
in step (2.4), the heap $q_2$ is a Fibonacci heap, which is used to sort the routers from small to large according to the value of $\psi'[r_i]$, and the order is updated synchronously with the value of $\psi'[r_i]$;
in step (2.7):
the upstream delay $\tau_{up}'$ and the downstream delay $\tau_{down}'$ of the current redundant sub-path:

$$\tau_{up}'=\tau(r_w,r_x)+\tau_{up}[r_w]$$

$$\tau_{down}'=\tau(r_w,r_x)+\tau_{down}[r_w]$$

the retransmission timeout $\theta_{retrans}'$ of the current router node:

$$\theta_{retrans}'=\theta_{retrans}[r_w]+(\tau_{queue}(l_{wx})+\tau_{process}(l_{wx})\times\alpha+\tau_{trans}(l_{wx})$$

the retransmission delay $\tau_{retrans}'$ of the current router node:

$$\tau_{retrans}'=\tau^l_{max}+\tau_{prim}+\theta_{retrans}'\times(\eta-1)+\tau_{down}'$$

where $\tau_{queue}(l_{wx})$ and $\tau_{process}(l_{wx})$ respectively represent the queuing delay and processing delay from $r_w$ to $r_x$,
in step (2.8), the logarithmic value $\psi_1$ of a true reliability and the logarithmic value $\hat{\psi}_x$ of a conversion reliability:

$$\psi_1=\log((1-\epsilon(r_w,r_x))(1-\epsilon(r_x,r_w)))$$

$$\hat{\psi}_x=\hat{\psi}+\psi'[r_w]$$

wherein if $l_{wx}\in \tilde{L}$, then $\hat{\psi}=\epsilon_{expell}$, but if $l_{wx}\notin \tilde{L}$, $\hat{\psi}=\psi_1$; $\epsilon_{expell}$ is the logarithmic value of a minimum link reliability in the current network:

$$\epsilon_{expell}=\log[\min_{l_z\in L^0}((1-\epsilon(l_z))/C)]$$

where $L^0$ comprises a newly added link $l=(r_{v,s},r_{vir})$ in step (2.1), and $l_z$ is a $z^{th}$ link in $L^0$; $\epsilon(l_z)$ indicates a packet loss rate of a path $l_z$, and C is a constant greater than 1;
the update parameters of step (2.9) are as follows:

$$prev_2[r_x]=r_w$$

$$\phi'[r_x]=\hat{\psi}_x$$

$$\psi'[r_x]=\psi_1+\psi'[r_w]$$

$$\tau_{up}=\tau(r_w,r_x)+\tau_{up}[r_w]$$

$$\tau_{down}=\tau(r_x,r_w)+\tau_{down}[r_w]$$

in step (2.11), the packet loss rate $\epsilon_{data}$ and retransmission timeout $\theta_r(p)$ of the redundant sub-path:

$$\epsilon_{one-way}=1-e^{\psi'[r_{vir}]}$$

$$\epsilon_{data}(p)=\epsilon_{one-way}^\eta$$

$$\theta_r(p)=\alpha\cdot(\tau_{up}[r_{vir}]+\tau_{down}[r_{vir}])$$

where $\epsilon_{one-way}$ represents a one-way packet loss rate of the redundant sub-path from $r_v$ to $r_{vir}$.

* * * * *